(12) United States Patent
Shapiro (10) Patent No.: US 11,922,498 B2
(45) Date of Patent: *Mar. 5, 2024

(54) METHODS AND SYSTEMS FOR MAXIMIZING SHARE PURCHASE UNDER AN EMPLOYEE STOCK PURCHASE PLAN WITH LIMITED PAYROLL DEDUCTIONS

(71) Applicant: Carver Edison, Inc., New York, NY (US)

(72) Inventor: Aaron J. Shapiro, New York, NY (US)

(73) Assignee: Carver Edison, Inc., New York, NY (US)

(*) Notice: Subject to any disclaimer, the term of this patent is extended or adjusted under 35 U.S.C. 154(b) by 636 days.

This patent is subject to a terminal disclaimer.

(21) Appl. No.: 17/121,079

(22) Filed: Dec. 14, 2020

(65) Prior Publication Data

US 2021/0097611 A1 Apr. 1, 2021

Related U.S. Application Data

(63) Continuation-in-part of application No. 16/895,765, filed on Jun. 8, 2020, now Pat. No. 10,867,352, which (Continued)

(51) Int. Cl.
*G06Q 40/04* (2012.01)
*G06Q 40/06* (2012.01)
*G06Q 30/06* (2023.01)

(52) U.S. Cl.
CPC .......... *G06Q 40/04* (2013.01); *G06Q 40/06* (2013.01); *G06Q 30/06* (2013.01)

(58) Field of Classification Search
CPC ..................................................... G06Q 40/04
See application file for complete search history.

(56) References Cited

U.S. PATENT DOCUMENTS 5,806,047 A 9/1998 Hackel et al.
5,903,879 A 5/1999 Mitchell
(Continued)

OTHER PUBLICATIONS

Your investment Plan IEEE (Year: 2007).*
(Continued)

*Primary Examiner* — Bruce I Ebersman
(74) *Attorney, Agent, or Firm* — DeLio Peterson & Curcio LLC; David R. Pegnataro (57) ABSTRACT

A method of increasing the number of shares purchased under an ESPP (potentially up to the maximum allowable) with limited employee net capital contributions, comprising the steps of selecting a monetary contribution amount or an amount to be deducted from an employee's monetary compensation for contribution to the plan, wherein the contribution amount is less than a maximum allowable contribution under allowable limits of the plan; optionally selecting a rebalancing price at which to sell shares of employer stock at the end of an offering period under the plan; having a third party or broker-dealer provide, via a loan to the employee, a supplemental monetary contribution equal to a difference between the employee's selected contribution amount and the maximum allowable contribution under the plan over the course of the offering period on behalf of the employee to the employer (or such lower supplemental monetary contribution amount as the employee may select or agree to), the supplemental monetary contribution received by a financial or ledger account used to purchase shares via the plan at the end of the offering period; and the delivery of shares to a third party for sale in an open market transaction or otherwise, or if applicable, for delivery to financial market counterparty upon exercise of an option that on the purchase date is in-the-money, to repay the proceeds of a loan and comply with employee elections.

9 Claims, 10 Drawing Sheets

Related U.S. Application Data is a continuation of application No. 16/601,041, filed on Oct. 14, 2019, now Pat. No. 10,679,291, which is a continuation-in-part of application No. 15/910,639, filed on Mar. 2, 2018, now Pat. No. 10,445,833.

(60) Provisional application No. 62/466,118, filed on Mar. 2, 2017.

(56) References Cited

U.S. PATENT DOCUMENTS

| | | | |
|---|---|---|---|
| 6,092,047 | A | 7/2000 | Hyman et al. |
| 6,161,096 | A | 12/2000 | Bell |
| 6,173,270 | B1 | 1/2001 | Cristofich |
| 6,571,219 | B1 | 5/2003 | Spivey |
| 6,609,111 | B1 | 8/2003 | Bell |
| 7,337,141 | B2 | 2/2008 | Sullivan |
| 7,529,701 | B2 | 5/2009 | Shields |
| 7,613,642 | B2 * | 11/2009 | Ryan ................ G06Q 40/10 705/36 R |
| 7,870,046 | B2 | 1/2011 | Gupta |
| 9,330,415 | B1 | 5/2016 | Castleman et al. |
| 2001/0014868 | A1 * | 8/2001 | Herz ................ G06Q 30/0269 705/26.1 |
| 2002/0032636 | A1 | 3/2002 | Shields et al. |
| 2002/0038271 | A1 | 3/2002 | Friend et al. |
| 2002/0042771 | A1 | 4/2002 | Shields |
| 2002/0194136 | A1 | 12/2002 | Sullivan et al. |
| 2003/0009406 | A1 | 1/2003 | Ross |
| 2004/0122759 | A1 | 6/2004 | Spivey |
| 2004/0267656 | A1 | 12/2004 | Friedman |
| 2005/0010518 | A1 | 1/2005 | Friedman |
| 2005/0027627 | A1 | 2/2005 | Lemken, Jr. et al. |
| 2005/0114242 | A1 | 5/2005 | Gray |
| 2005/0137967 | A1 | 6/2005 | Ryan |
| 2005/0187851 | A1 * | 8/2005 | Sant ................ G06Q 40/06 705/36 R |
| 2005/0192875 | A1 | 9/2005 | White |
| 2005/0216384 | A1 * | 9/2005 | Partlow ................ G06Q 40/06 705/35 |
| 2006/0041538 | A1 * | 2/2006 | King ................ G06Q 30/0241 |
| 2006/0184446 | A1 | 8/2006 | Ross |
| 2006/0282363 | A1 | 12/2006 | Tarbox et al. |
| 2007/0083455 | A1 | 4/2007 | Bove |
| 2007/0100726 | A1 | 5/2007 | O'Flinn et al. |
| 2007/0112762 | A1 * | 5/2007 | Brubaker ............ G06F 16/9535 707/999.005 |
| 2007/0300152 | A1 * | 12/2007 | Baugher ............ G06Q 30/0258 705/14.56 |
| 2008/0133393 | A1 | 6/2008 | Arnold |
| 2011/0106689 | A1 | 5/2011 | Ryan |
| 2011/0173138 | A1 | 7/2011 | Ryan |
| 2013/0006789 | A1 * | 1/2013 | Fulkerson ............ G06Q 10/00 705/26.1 |
| 2013/0282544 | A1 | 10/2013 | Feinschreiber |
| 2015/0134567 | A1 | 5/2015 | Maher |
| 2016/0225081 | A1 | 8/2016 | Hecht |

OTHER PUBLICATIONS

Electronic Financial Markets MIT (Year: 1999).*
Employee Stock Plans Provide 401(k) Loan Alternative, Stephen Miller (Year:2014).
Red Hat to offer employees stock purchase plan as an incentive (WRAL tech Wire, Jun. 24, 2016 (Jun. 24, 2016) p. 4, KP055819526.

* cited by examiner

| Employee Contribution | Proposed | | | |
|---|---|---|---|---|
| | Total Shares Purchased | Shares Sold To Cover Loan | Long Term Shares | Employee Profit |
| 1% | 588.24 | 375.00 | 213.24 | $746.32 |
| 2% | 588.24 | 333.33 | 254.90 | $892.16 |
| 3% | 588.24 | 291.67 | 296.57 | $1,037.99 |
| 4% | 588.24 | 250.00 | 338.24 | $1,183.82 |
| 5% | 588.24 | 208.33 | 379.90 | $1,329.66 |
| 6% | 588.24 | 166.67 | 421.57 | $1,475.49 |
| 7% | 588.24 | 125.00 | 463.24 | $1,621.32 |
| 8% | 588.24 | 83.33 | 504.90 | $1,767.16 |
| 9% | 588.24 | 41.67 | 546.57 | $1,912.99 |
| 10% | 588.24 | 0.00 | 588.24 | $2,058.82 |
| | Traditional | | | |
| | Total Shares Purchased | Shares Sold To Cover Loan | Long Term Shares | Employee Profit |
| 1% | 58.82 | 0.00 | 58.82 | $205.88 |
| 2% | 117.65 | 0.00 | 117.65 | $411.76 |
| 3% | 176.47 | 0.00 | 176.47 | $617.65 |
| 4% | 235.29 | 0.00 | 235.29 | $823.53 |
| 5% | 294.12 | 0.00 | 294.12 | $1,029.41 |
| 6% | 352.94 | 0.00 | 352.94 | $1,235.29 |
| 7% | 411.76 | 0.00 | 411.76 | $1,441.18 |
| 8% | 470.59 | 0.00 | 470.59 | $1,647.06 |
| 9% | 529.41 | 0.00 | 529.41 | $1,852.94 |
| 10% | 588.24 | 0.00 | 588.24 | $2,058.82 |
| | Improvement Versus Traditional | | | |
| | Total Shares Purchased | Shares Sold To Cover Loan | Long Term Shares | Employee Profit |
| 1% | 900% | - | 263% | 263% |
| 2% | 400% | - | 117% | 117% |
| 3% | 233% | - | 68% | 68% |
| 4% | 150% | - | 44% | 44% |
| 5% | 100% | - | 29% | 29% |
| 6% | 67% | - | 19% | 19% |
| 7% | 43% | - | 13% | 13% |
| 8% | 25% | - | 7% | 7% |
| 9% | 11% | - | 3% | 3% |
| 10% | 0% | - | 0% | 0% |
| Average Outperformance | 193% | - | 56% | 56% |

FIG. 6

Sample Capital Flow Analysis

710

| | |
|---|---|
| Beginning Stock Price | $10 |
| Employee Selected Sale Price | $12 |
| Discount | 15% |
| Lookback (Lower of Start/Finish) | Yes |
| Employee Contribution | $100 |
| Broker Loan | $100 |
| Total Capital To Purchase Shares | $200 |
| Remaining Shares To Retain | 0% |

| | | Out of The Money Option[2] | | | | | | | | In The Money Option[3] | | | |
|---|---|---|---|---|---|---|---|---|---|---|---|---|---|
| Ending Stock Price | $1.00 | $2.00 | $4.00 | $6.00 | $8.00 | $10.00 | $11.00 | $12.00 | $13.00 | $14.00 | $15.00 |
| Purchase Price | $0.85 | $1.70 | $3.40 | $5.10 | $6.80 | $8.50 | $8.50 | $8.50 | $8.50 | $8.50 | $8.50 |
| | | | | | | | | | | | |
| Total Shares Purchased | 235.29 | 117.65 | 58.82 | 39.22 | 29.41 | 23.53 | 23.53 | 23.53 | 23.53 | 23.53 | 23.53 |
| Total Shares Available For Quick Sale | 23.53 | 23.53 | 23.53 | 23.53 | 23.53 | 23.53 | 23.53 | 23.53 | 23.53 | 23.53 | 23.53 |
| Min. Specified Number of Shares - Cover Loan | 100.00 | 50.00 | 25.00 | 16.67 | 12.50 | 10.00 | 9.09 | 8.33 | 8.33 | 8.33 | 8.33 |
| Remaining Shares After Options Exercise | 235.29 | 117.65 | 58.82 | 39.22 | 29.41 | 23.53 | 23.53 | 0.00 | 0.00 | 0.00 | 0.00 |
| Remaining Shares After Covering Loan | 135.29 | 67.65 | 33.82 | 22.55 | 16.91 | 13.53 | 14.44 | 0.00 | 0.00 | 0.00 | 0.00 |
| Remaining Shares Sold To Market | 135.29 | 67.65 | 33.82 | 22.55 | 16.91 | 13.53 | 14.44 | 0.00 | 0.00 | 0.00 | 0.00 |
| Total Proceeds From Sale | $235.29 | $235.29 | $235.29 | $235.29 | $235.29 | $235.29 | $258.82 | $282.35 | $282.35 | $282.35 | $282.35 |
| | | | | | | | | | | | |
| Capital Returned To Employee (Contribution + Profit) | $135.29 | $135.29 | $135.29 | $135.29 | $135.29 | $135.29 | $158.82 | $182.35 | $182.35 | $182.35 | $182.35 |
| Capital Returned To Broker (Loan Proceeds) | $100.00 | $100.00 | $100.00 | $100.00 | $100.00 | $100.00 | $100.00 | $100.00 | $100.00 | $100.00 | $100.00 |
| Total Proceeds Returned | $235.29 | $235.29 | $235.29 | $235.29 | $235.29 | $235.29 | $258.82 | $282.35 | $282.35 | $282.35 | $282.35 |
| | | | | | | | | | | | |
| Net P/L For Employee | $35.29 | $35.29 | $35.29 | $35.29 | $35.29 | $35.29 | $58.82 | $82.35 | $82.35 | $82.35 | $82.35 |
| Employee Contribution | $100.00 | $100.00 | $100.00 | $100.00 | $100.00 | $100.00 | $100.00 | $100.00 | $100.00 | $100.00 | $100.00 |
| Effective Return | 35.3% | 35.3% | 35.3% | 35.3% | 35.3% | 35.3% | 58.8% | 82.4% | 82.4% | 82.4% | 82.4% |

720, 730, 740, 750

[1] Broker will only sell options on 23.53 shares at the outset of offering period.
[2] Out of money options will be unexercised, transaction will be an open market sale.
[3] In the money options will be exercised, transaction will be share delivery to counterparty

FIG. 7

METHODS AND SYSTEMS FOR MAXIMIZING SHARE PURCHASE UNDER AN EMPLOYEE STOCK PURCHASE PLAN WITH LIMITED PAYROLL DEDUCTIONS

BACKGROUND OF THE INVENTION

1. Field of the Invention

The present invention relates generally to employee stock purchase plans ("ESPP"), whether qualified or non-qualified, as defined by the IRS. More particularly, the present invention relates to systems and methods for providing a solution to allow employees to purchase an increased number of shares under their ESPP with limited net capital contributions and without decreasing take home pay.

2. Description of Related Art

Several thousand publicly traded employers offer compensation to their employees in the form of equity. Some forms of equity compensation plans include employee stock purchase plans ("ESPP"), restricted stock unit plans ("RSU"), and employee stock option plans. Equity compensation plans provide benefits for both the employer and the employee. Employers benefit by, in many cases, being able to conserve cash by providing a portion of employee compensation in the form of equity compensation, while employees enjoy the economic benefit of purchasing or receiving company stock. Employee stock purchase plans are known and exist in several different forms. An employee stock purchase plan is generally a contractual right granted to employees that gives employees the option to purchase company stock at the end of a specified period, typically at a discount to the market price or at a previously specified price.

At the beginning of an offering period, an employee who wishes to participate in an ESPP typically indicates the percentage or dollar amount of compensation to be deducted from their payroll every pay period. Under most stock purchase plans, the purchase price is set at a discount from the fair market price of the stock. In many plans, the discount is applied to the value of the stock on the first or last day of an offering period, whichever is lower (otherwise known as a "lookback"). Some plans allow employees to increase or decrease their payroll deduction percentage throughout the offering period. Ultimately, the design of employee stock purchase plans varies greatly across companies. Some companies currently offer plans with a limited discount while others provide a subsidy or loan provision for employees.

Although the IRS presently limits purchases under a qualified employee stock purchase plan to $25,000, many companies further restrict the value of stock purchases to the plan to ten percent (10%) of an employee's income. For example, assume Company XYZ allows Employee A to contribute a maximum of 10% annually of their $50,000 per year income to an employee stock purchase plan, with an offering period of one year (for illustrative purposes, tax consequences are not included, and all numbers are on an annual basis). Under the plan rules set forth by Company XYZ, an employee would be able to contribute $5,000 annually to the plan, as compared to $25,000 under the IRS restrictions. Further, assume the plan offers a fifteen percent (15%) discount, with a lookback feature that applies the 15% discount to the lower of the two market values at the beginning and end of the offering period. Assume further that shares of Company XYZ are trading at $10 per share at both the beginning and end of the offering period. For exemplary purposes only, the offering period is presumed to have a length of one year. Although Employee A could contribute 10% of their income under the terms of the plan, Employee A elects to contribute only five percent (5%) of their income because of personal liquidity constraints. Consequently, at the end of the offering period, Employee A is only able to purchase 294.12 shares (($50,000*5%=$2,500)/($10*(100%−15%))=294.12), as compared to 588.24 shares (($50,000*10%=$5,000)/($10*(100%−15%))=588.24) had Employee A maximized their contribution to their employee stock purchase plan. The employee would stand to purchase an additional 294.12 shares by maximizing their contribution.

Accordingly, by contributing 5% to the ESPP, the employee recognized $441.18 (($10−$8.50=$1.5)*(294.12)=$441.18) in capital gains as compared to $882.36 (($10−$8.50=$1.5)*(588.24)=$882.36) if the employee would have contributed 10% to the plan. In this example, by choosing to contribute 5% instead of 10% to the ESPP, Employee A surrendered $441.18 in risk free profit (assuming the immediate sale of the securities at the $10 price, and assuming no commissions or fees).

Currently known employee stock purchase plans have several distinct disadvantages for both employees and employers. The capital requirements associated with fully contributing to an employee stock purchase plan are burdensome and unfeasible for many rank and file employees, as the employee must contribute after-tax dollars to the plan. Many of these employees require the additional capital to support their families or meet other similar financial obligations. Consequently, according to a recent Fidelity study, the average participation rate in ESPPs nationally is 30%. By not participating in an employer's ESPP, the average employee forfeits an estimated $3,331 annually on an after tax basis, according to a recent academic study. The Federal Reserve Bank of St. Louis has calculated that the Real Median Personal Income nationally is $31,009.00; therefore, it is estimated that an average employee forfeits nearly 11% of their annual salary by not maximizing their contribution to their ESPP. The interest rate charged by many banks for unsecured loans that could be used to purchase stock as part of the ESPP may make borrowing from a bank or other lenders economically unfeasible.

Lack of employee participation is also costly for employers. When an employee purchases shares at a discount via their ESPP, the employer recognizes a tax write-off if the employee sells their shares within two years of the grant date (i.e., the beginning of the ESPP offering period) or one year of the purchase date, whichever is later (such sale, a "disqualifying disposition"). The employer's write-off is the difference between the cost basis and the price at which the shares were acquired from the company. For example, if an employee through the ESPP purchases at $8.50 shares that had a fair market value of $10 on the purchase date (due to the 15% discount) and sells the shares before the later of one year of the purchase date and two years of the grant date, the employer is entitled to a $1.50 ($10−$8.50) per share tax write-off as specified in Section 423 of the Internal Revenue Code (the "Code"). According to a recent Fidelity study, nearly half of all employees sell their shares within the first two years, i.e., make what is known as a "disqualifying disposition." Accordingly, employers of sufficient size forfeit several million dollars per year in the form of a tax write-off by lack of employee participation. Although some employers have added loan or subsidy programs as part of their ESPP to facilitate employee participation, the complexity and balance sheet requirements have made such plans unpopular. Consider, for example, if half of the 10,000 employees at a public company where the average salary is $50,000 took advantage of their company's loan or subsidy program in which the company funded the full participation amount. The employer would be required to use $25,000,000 of capital on its balance sheet to facilitate such a program. The cost of capital alone makes such a large commitment of capital impractical for most employers.

Therefore, a need exists for improved methods and systems to provide employees with the ability to increase the number of shares purchased under their ESPP (potentially up the maximum allowable), with limited net capital contributions and without decreasing take home pay, while shifting the cost and capital burden away from employers.

SUMMARY OF THE INVENTION

Bearing in mind the problems and deficiencies of the prior art, it is therefore an object of the present invention to provide a system and method to allow employees to increase the number of shares purchased in an offering period under their ESPP without decreasing take home pay for employees, and without requiring employers to provide loans or subsidies to the employees. Such method is a new and useful improvement over traditional employee stock purchase plans which provides benefits to both the employee and employer, while shifting the costs and capital burden to third party financial market participants. The present new and useful process provides concrete and tangible improvements by allowing an employee to increase the number of shares they purchase under their plan (potentially up the maximum allowable) regardless of their ability to afford participating in the plan.

It is yet another object of the present invention to provide an improved method for increasing the number of shares purchased under an ESPP which may shift the costs away from the employee and employer to third parties, including financial market participants.

Still other objects and advantages of the invention will be apparent from the specification.

The above and other objects, which constitute a unique application of concepts from the insurance, employee benefits, and finance industries, which would not be apparent to those skilled in the art, are achieved in the present invention which is directed to a method of increasing the number of shares purchased under an ESPP (potentially up the maximum allowable) regardless of an employee's ability to afford a decrease in take home pay. The method comprises an enrollment process whereby (1) the employee selects a percentage of their income or other amount to contribute to the ESPP (which is less than or equal to the maximum allowable percentage or amount under the limits of the plan), (2) the employee agrees to sell some portion of their shares at a future date, in which event an independent broker-dealer or third party will either sell a derivative or other financial instrument to a counterparty in the financial markets, or charge fees, interest or retain a portion of profits made by the employee under the plan, (3) an independent broker-dealer, non-bank lender or similar third-party will lend the employee an amount to permit the employee to increase the employee's capital contribution under the ESPP to enable more shares to be purchased (potentially up the maximum allowable) directly or by depositing in the employee's bank account or providing an employee with a transaction card with the equivalent amount of cash on a schedule which may coincide with the timing of the employees payroll deductions, (4) the employee subsequently purchases securities under the ESPP, (5) a portion of those securities are either delivered to the broker-dealer or third party to repay the loan plus any applicable fees or profit share or fund the exercise price, (6) those shares either are sold via an open market transaction or otherwise, or are delivered to a counterparty upon exercise of an option (if an option was sold) depending on the underlying stock price movement during the life of the offering period, (7) the loan repayment amount is debited from the proceeds of such a sale or delivery to the third party broker-dealer, non-bank lender or similar third-party to repay the loan, and (8) if there is an excess of shares delivered to the third party that are not needed to repay the loan proceeds plus any applicable fees or profit share, the remaining shares not sold to repay the loan or fulfill employee elections are deposited in a brokerage account of the employee.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 7 is a table showing an exemplary capital flow analysis associated with a hypothetical employee utilizing the methodology of the present invention.

DESCRIPTION OF THE EMBODIMENT(S)

In describing the embodiments of the present invention, reference will be made herein to FIGS. 1-7 of the drawings, in which like numerals refer to like features of the invention.

In describing the embodiments of the present invention herein, the word "exemplary" is used to mean serving as an example, instance or illustration. Any aspect or design described herein as "exemplary" is not necessarily intended to be construed as preferred or advantageous over other aspects or design. Rather, the use of the word "exemplary" is merely intended to present concepts in a concrete fashion. In describing the embodiments of the present invention herein, the word "plurality" is used to mean more than one. Any aspect or design described herein with reference to a "plurality" is not intended to be construed as being the potential set with the largest number of elements.

The present invention generally provides methods and systems, e.g., computer-implemented methods and computer systems, for increasing the number of shares an employee is able to purchase (potentially up the maximum allowable) under their employee stock purchase plan ("ESPP") with limited employee net capital contributions. As used herein, the terms "employee stock purchase plan" or "ESPP" may be used interchangeably to generally describe a qualified employee stock purchase plan under Section 423 of the Internal Revenue Code, or a non-qualified employee stock purchase plan structured like a qualified 423 plan but without the preferred tax treatment for employees, including but not limited to, employee stock purchase plans, employee stock ownership plans, employee stock purchase deposit plans, and profit sharing plans, or the like.

The methodology of the present invention provides a significant quantifiable improvement over existing ESPPs. In contrast to conventional ESPPs, the present invention allows every employee to purchase as much as the maximum number of shares possible under their ESPP regardless of their ability to afford payroll deductions, shifts the cost and capital requirements of the plan away from employees and employers to third parties, including financial market participants.

Figure 1:
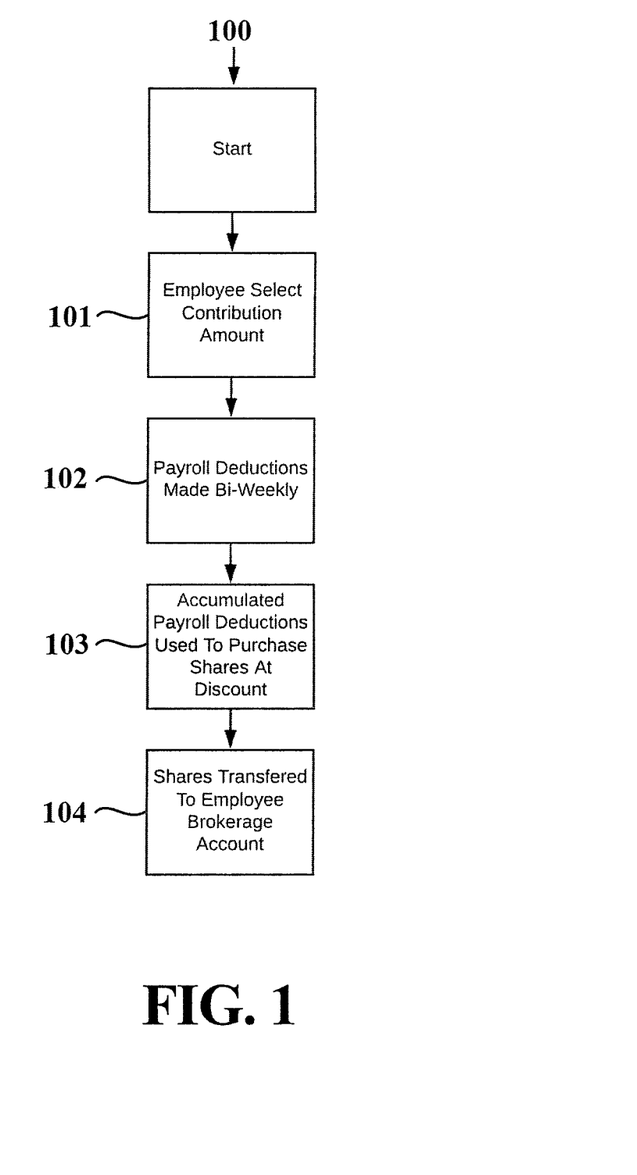
FIG. 1 is a flow diagram showing a traditional employee stock purchase plan of the prior art.
Figure 2A:
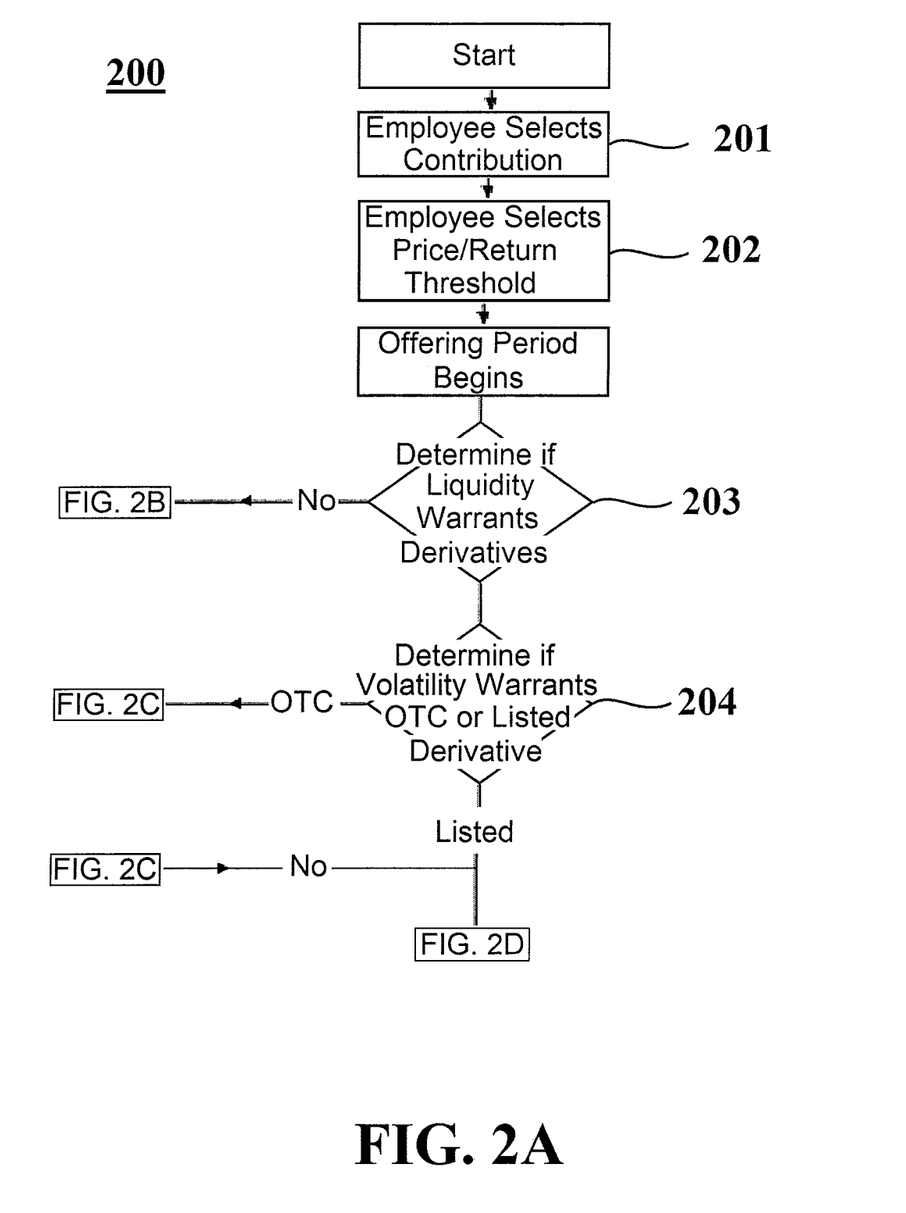
FIG. 2A is a first portion of a flow diagram showing an illustrative embodiment of the methodology for increasing share purchase of the present invention.
Figure 2B:
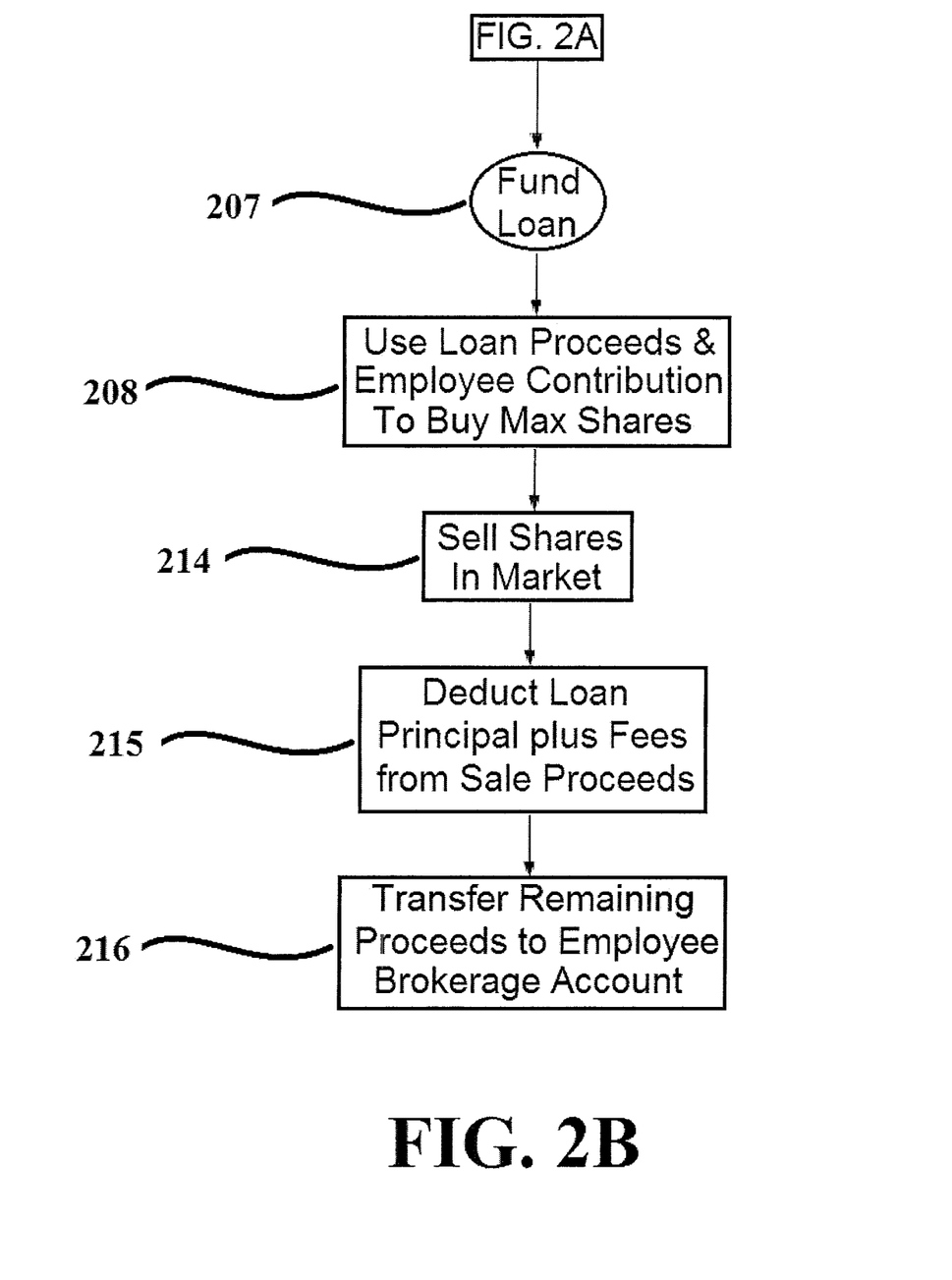
FIG. 2B is a second portion of the flow diagram beginning at FIG. 2A, depicting the process flow if liquidity and volatility do not warrant the use of derivatives.
Figure 2C:
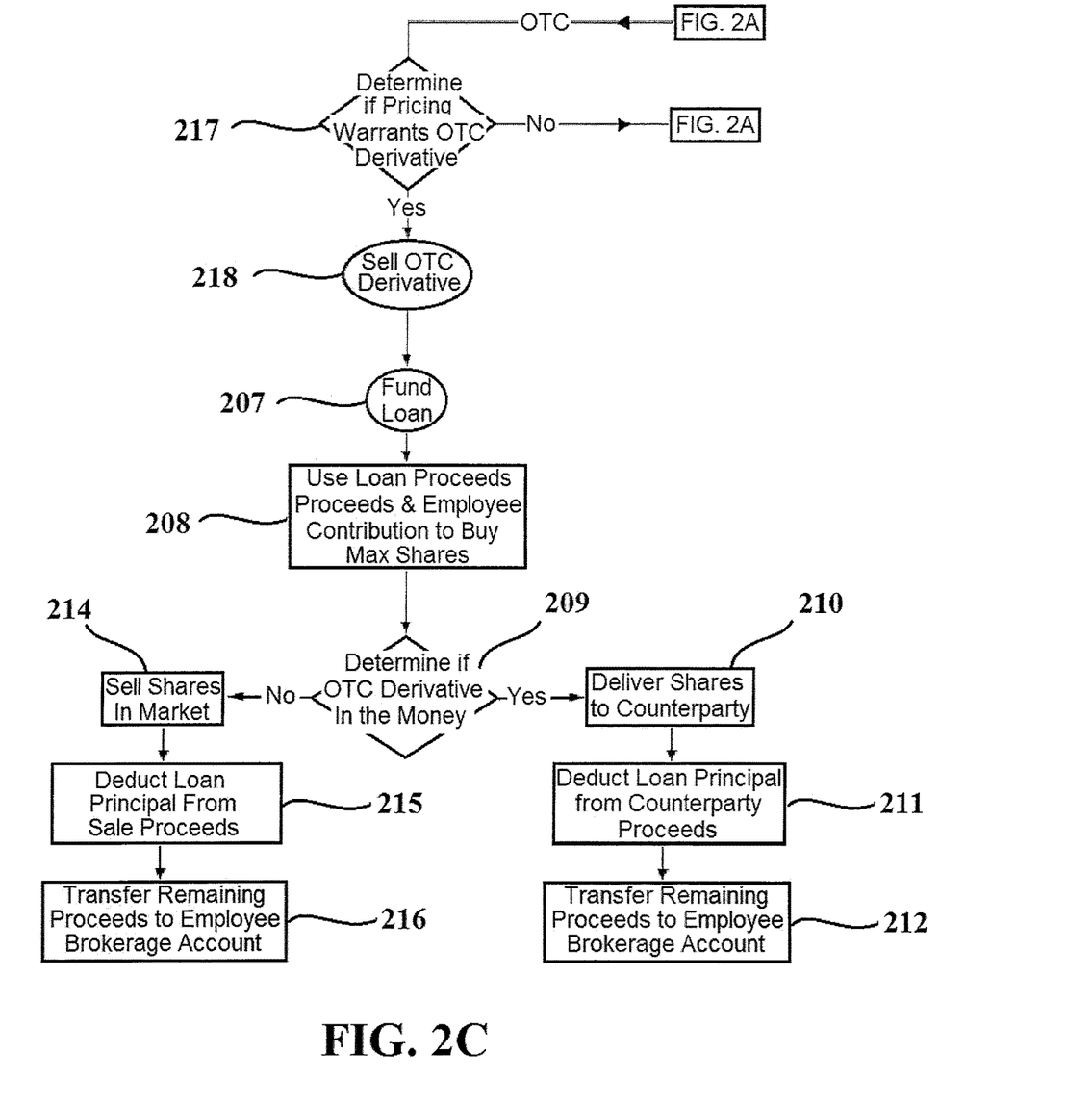
FIG. 2C is a third portion of the flow diagram beginning at FIG. 2A, depicting the process flow if liquidity and volatility warrant the use of over-the-counter derivatives.
Figure 2D:
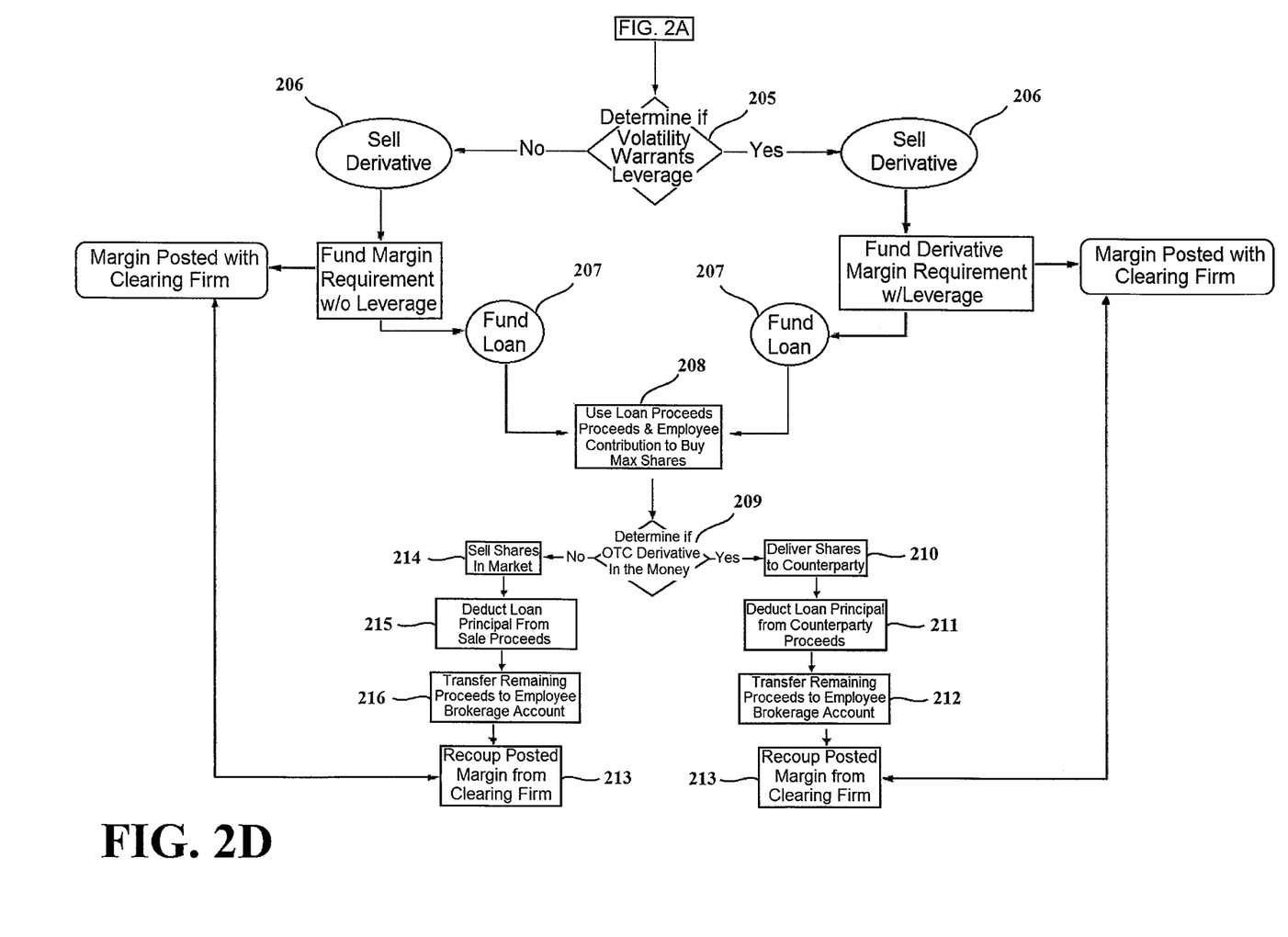
FIG. 2D is a fourth portion of the flow diagram beginning at FIG. 2A, depicting the process flow if liquidity and volatility warrant the use of listed derivatives.

FIG. 1 is a flow diagram showing a traditional ESPP process 100. At the beginning of an offering period, an employee who wishes to participate in his or her employer's ESPP indicates the percentage or dollar amount of compensation to be deducted from their payroll every pay period for contribution to the ESPP (step 101). Payroll deductions are then made (step 102), for example, bi-weekly, and the accumulated payroll deductions are used to purchase shares of employer stock at the end of an offering period (step 103), typically at a discount from the fair market value of the shares. The shares are then transferred to the employee's brokerage account, at which point the shares are wholly owned and controlled by the employee (step 104). Under a traditional ESPP, the ability of the employee to purchase employer stock is often limited by the employee's liquidity. For example, if an employee is only able to contribute 2% of their income to the plan, with a maximum allowable contribution of 10%, the employee would forfeit the remaining 8% they were eligible to contribute but couldn't afford to.

The method of the present invention draws on concepts from traditional ESPPs to create a new financial product which provides a means for an employee to purchase an increased number of shares under their ESPP with limited net capital contributions to enhance take home pay. Further, the methodology of the present invention shifts the costs away from the employee and employer to third parties, including financial market participants, who provide a loan in order for the employee to purchase an increased amount of shares (potentially up the maximum allowable) during the offering period.

Referring now to FIGS. 2-7, collectively, an overview of the methodology of the present invention is depicted. FIGS. 2A-2D depict a process diagram showing an overview of an illustrative embodiment of the method 200 of the present invention. It should be understood by those of ordinary skill in the art that the method of the present invention as described herein does not require the performance of every step depicted in FIGS. 2A-2D and that one or more embodiments may omit certain functionality or calculations which may or may not be used in the performance of subsequent optional steps of the method. The illustrative method shown in FIGS. 2A-2D comprises, during the pre-enrollment period, one or more employees each selecting a desired monetary contribution amount (step 201), which is less than the maximum allowable contribution under the ESPP, and potentially selecting a rebalancing threshold or price (step 202). The rebalancing threshold is the price at which the employee is willing to sell shares of stock at the end of the offering period in an amount sufficient to generate proceeds of at least the loan amount and any applicable fees, and may be calculated, for example, as a theoretical stock price, an annualized return, or a minimum internal rate of return ("IRR"). It should be understood by those skilled in the art that the rebalancing threshold may be calculated by any now known or later developed method of calculation, and that the present invention is not limited to the methods of calculation as described herein. It should be further understood by those of ordinary skill in the art that reference to the "selection" of a rebalancing price or threshold in the description or drawings herein is intended to encompass either the designation of a price by the employee, or alternatively, an agreement by the employee to sell shares at some future date at a price designated by an independent broker-dealer, non-bank lender or similar third party.

In one or more embodiments, the employee may make the selection of his or her monetary contribution amount and, optionally, a rebalancing threshold or price, using an electronic enrollment application accessible such as via desktop or mobile computing device in network communication with a server controlled by the respective employer, its agent or plan administrator. The electronic enrollment application may further include a graphical user interface (GUI) for permitting selections of the enrollment parameters by the employee. The selected monetary contribution amounts for each employee are directly or indirectly withheld or deducted via a payroll system coupled to the electronic enrollment application and comprising a withholdings module executable by a processor residing on a server controlled by the respective employer, its agent or plan administrator. The selected monetary contribution amounts for each employee are used to fund or credit a financial or ledger account of each employee at their respective employer, or at a financial institution or bank, which is used to purchase shares of employer stock at the end of the offering period. Funds may be directly provided to employees via direct deposit or by providing the equivalent amount via a transaction card to employees to offset increased payroll deductions.

In an embodiment, the method may further comprise, at step 203, calculating or processing each employee's selected monetary contribution amount and, if applicable, rebalancing price, in relation to historical and implied volatility and liquidity of their respective employer's stock price to define an employer-specific volatility and liquidity value. These calculations may be performed using volatility and liquidity calculation modules executable by a processor residing on a remote server operated by a third party lender or broker-dealer (or an agent of such third party), which is in network communication with the server controlled by the respective employer or its agent and a financial exchange market for acquiring shares of employer stock. Using the employer-specific liquidity value, a determination is then made as to whether listed or over-the-counter derivatives should be utilized to facilitate disposition of shares of employer stock on the financial exchange market (step 204).

The method may further comprise calculating or processing, via the volatility calculation module, each employee's selected monetary contribution amount and, if applicable, rebalancing price, in relation to historical and implied volatility of their respective employer's stock price to define an employer-specific leverage value and determine whether the selected or designated rebalancing price is sufficient to warrant the use of derivatives. The method further comprises, at step 205, determining whether, based on the calculated employer-specific leverage value, volatility of the stock warrants using leverage to fund any element of the transaction.

A transaction module executable by the processor residing on the third party server then aggregates each of the employees into one of a plurality of virtual containers, each having a distinct identification number assigned thereto, based on the selected monetary contribution amount and rebalancing price for each of the employees. Each of the virtual containers, and the respective aggregated employees in each container, are then displayed on a display interface coupled to the remote third party server and accessible by the third party lender or broker-dealer. A plurality of trade positions related to each respective employer's stock are presented on the display interface, and order instructions for the trade positions are sequenced via the transaction module based on the aggregated virtual containers.

Figure 5:
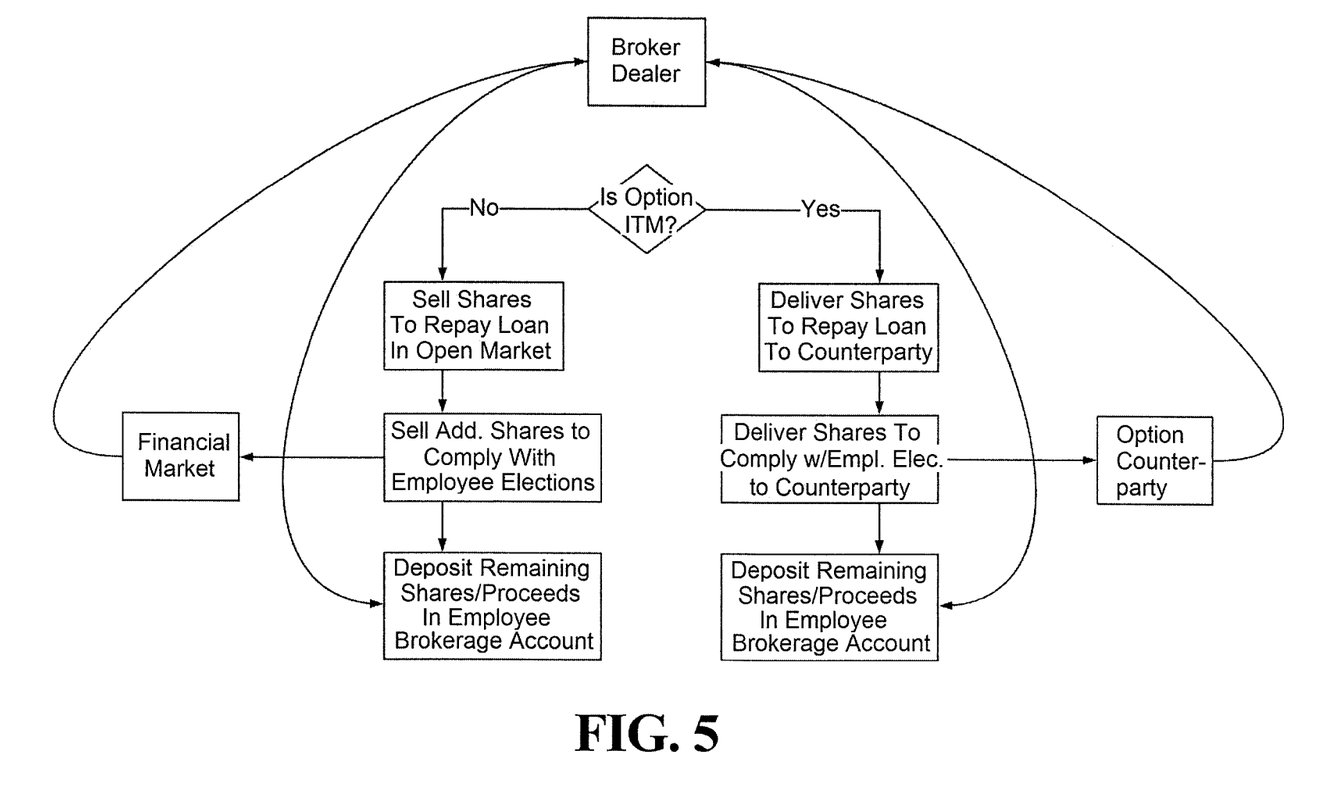
FIG. 5 is a flow diagram showing an exemplary option exercise according to an embodiment of the method of the present invention as shown in FIGS. 2A-2D.

If the volatility calculation module determines that leverage to acquire shares of employer stock should be utilized, the method comprises, at step 206, selling or instructing a designated broker to sell or take "short" and "long" positions in any derivative instrument including but not limited to, options, futures, swaps, or the like, at a strike price designated or agreed to by the employee (see also FIG. 5, depicting the general mechanics of the option). The principles of security instruments such as derivatives, options, futures, or swaps are generally known in the art, and therefore a detailed description of the respective mechanics is not included herein. As used herein, the terms "derivative" or "option" may be used interchangeably to represent any security instrument utilized by the designed broker. It should be understood by those skilled in the art that the present invention encompasses the use of any now known or later developed security instrument, and is not limited to those described herein. The purpose of selling such a security is not to hedge but rather to lock in a price at which an employee would sell on the purchase date a sufficient number of shares to generate proceeds at least equal to the loan amount. This concept is referred to as "rebalancing" in the investment management industry. The strike price is either computed by solving for the price that the underlying stock price must reach to achieve the employee-specified internal rate of return or by using the theoretical price designated or agreed to by the employee. The broker-dealer selling the option posts any necessary margin requirement with a clearing firm.

At step 207, the broker-dealer or third party lender then makes a loan to the employee. The loan amount may be the difference between the employee's selected contribution and the maximum allowable contribution under the ESPP, or some lower amount determined by the company, independent broker-dealer or non-bank lender, or selected by the employee. The aggregate capital contributions (loan principal and employee payroll deductions) are used to purchase shares of employer stock on behalf of the employee at the purchase price designated by the employee's ESPP (step 208). Step 209 comprises determining whether, at the end of the offering period, the derivative (if one was sold) is in-the-money ("ITM") or out-of-the-money ("OTM"). If the derivative is ITM, instructions to issue the requisite number of shares to fulfill any obligation under the option contract are disbursed by a share disbursement module executable by the processor residing on the third party server and the requisite shares are delivered to the counterparty (contingent upon receipt of the exercise price). The counterparty delivers to the broker-dealer the proceeds from the exercise of the options (strike price multiplied by number of shares). The broker-dealer then deducts the loan repayment amount from the proceeds and transfers any remaining shares and/or profit from the sale to the employee's brokerage account (steps 210 to 212). The proceeds of the derivative are credited to a separate bank account owned exclusively by the third party administrator or broker-dealer. Upon completion of the transaction, the broker dealer recoups any margin posted with the clearing firm (step 213).

Conversely, if the derivative is OTM, the requisite number of shares to fulfill any obligation under the loan is sold in the open market or otherwise (step 214). The broker-dealer then deducts the loan repayment amount from the proceeds from the sale of the shares and transfers any remaining shares and/or profit from the sale to the employee's brokerage account (steps 215 to 216). Upon completion of the transaction, the broker dealer recoups any margin posted with the clearing firm (step 213).

Alternatively, if no derivatives were used (including in circumstances in which the volatility calculation module determined that leverage to acquire shares of employer stock was not required), at least a portion of the shares of acquired employer stock, plus a sufficient number of shares to cover any applicable fees, are sold in the open market or otherwise. The loan repayment amount is deducted from the proceeds from the sale of the shares and any remaining shares and/or profit from the sale is transferred to the employee's brokerage account, as described above with respect to steps 214 to 216.

A unique aspect of the methodology of the present invention is that there is minimized risk to the broker-dealer in providing the initial loan or supplemental monetary contribution on behalf of the employee. At the end of the offering period, whether or not the derivative (if one was sold) is ITM or OTM, shares of stock are purchased by the employee from the company via the ESPP and either (i) a portion of the shares is delivered to the broker-dealer or third party that have a value equal to the loan repayment amount (with respect to which broker-dealer or third party may upon sale realize an amount higher or lower than the loan repayment amount) or (ii) the broker-dealer will receive (directly or indirectly) the cash proceeds from the exercise price of the option (in the event of a ITM option), which is in the loan repayment amount. As such, the broker-dealer will always be made whole (by either receiving, directly or indirectly, cash proceeds from the counterparty's exercise of an option, or receiving employer stock having a value on receipt equal to the loan repayment amount), provided that it is able to sell any employer stock it receives on the purchase date at the price of the stock on the purchase date, while the employee has the opportunity to achieve increased profits from the purchase of shares as if the employee had initially increased their contribution to their ESPP by the amount of the loan.

Figure 3:
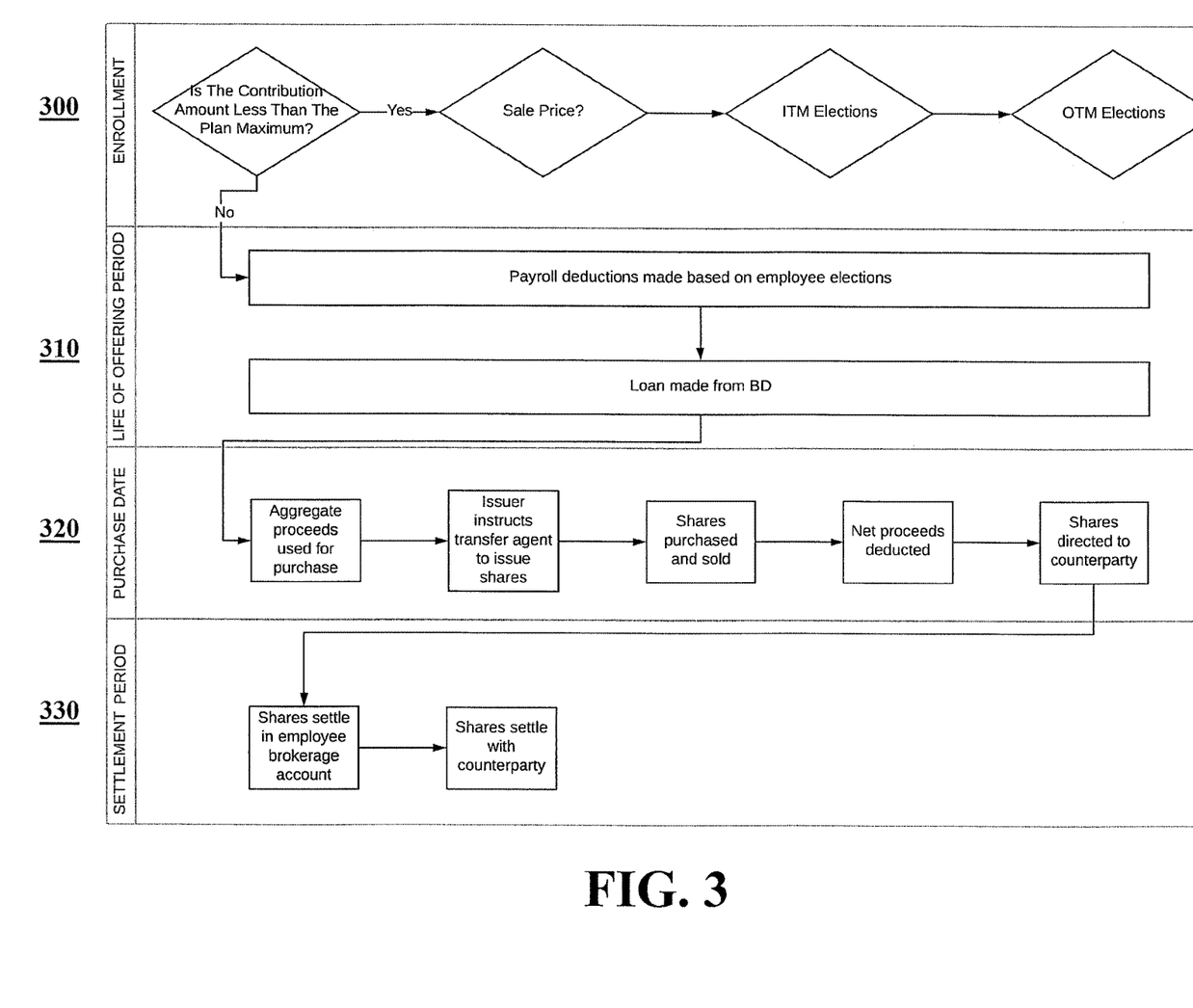
FIG. 3 is a flow chart showing an exemplary timeline according to an illustrative embodiment of the method of the present invention.
Figure 4:
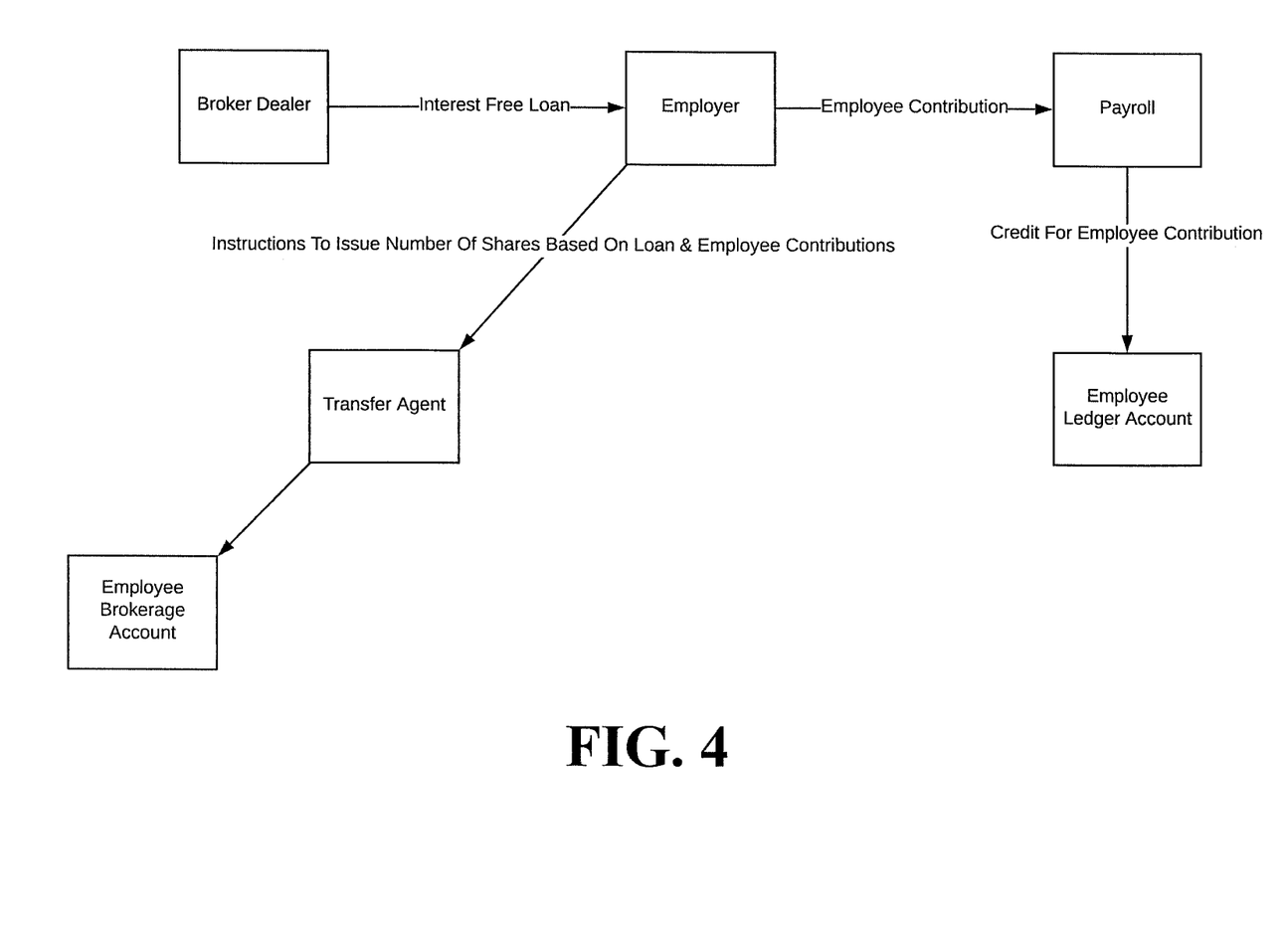
FIG. 4 is a block diagram showing exemplary loan mechanics according to an embodiment of the method of the present invention as shown in FIGS. 2A-2D.

FIG. 3 depicts a transactional flowchart representing the distinct time periods of the methodology of the present invention. During the pre-enrollment block 300, the employee selects a monetary contribution rate or amount to be contributed to the ESPP in after-tax dollars. If the employee elects to maximize their contribution, no further action is required during the pre-enrollment period and the ESPP operates as a traditional ESPP. By contrast, if the employee elects to contribute less than the maximum allowable under the terms of the plan, the employee may be required to then select or agree to a theoretical price or minimum internal rate of return ("IRR") at which the employee would sell their shares at the end of the offering period in an amount equal to the loan amount divided by such selected or agreed to price. In the event of such a requirement, a third party broker-dealer then sells a derivative instrument to a financial market counterparty whereby the broker-dealer posts any necessary margin requirement with the appropriate clearing firm. During the offering period (block 310), the employee's elected monetary contribution is deducted from payroll and combined with a supplemental monetary contribution or loan from a third party or broker-dealer equal to the difference between the employee's selected contribution amount and the maximum allowable contribution under the plan over the course of the offering period, or a lesser amount as may be selected or agreed to by the employee. The mechanics of the loan are more particularly shown in FIG. 4. On the purchase date (block 320), the aggregate proceeds, which includes payroll deductions and loan proceeds, are used to purchase shares of stock. At the end of the offering period (block 330), the broker-dealer purchases shares using the aggregate contribution and then delivers shares to the option counterparty, if necessary ("transaction" or "sale transaction"). If the employee had shares remaining after selling to cover the proceeds of the loan, the broker-dealer deposits the shares in the employee's brokerage account.

Figure 6:
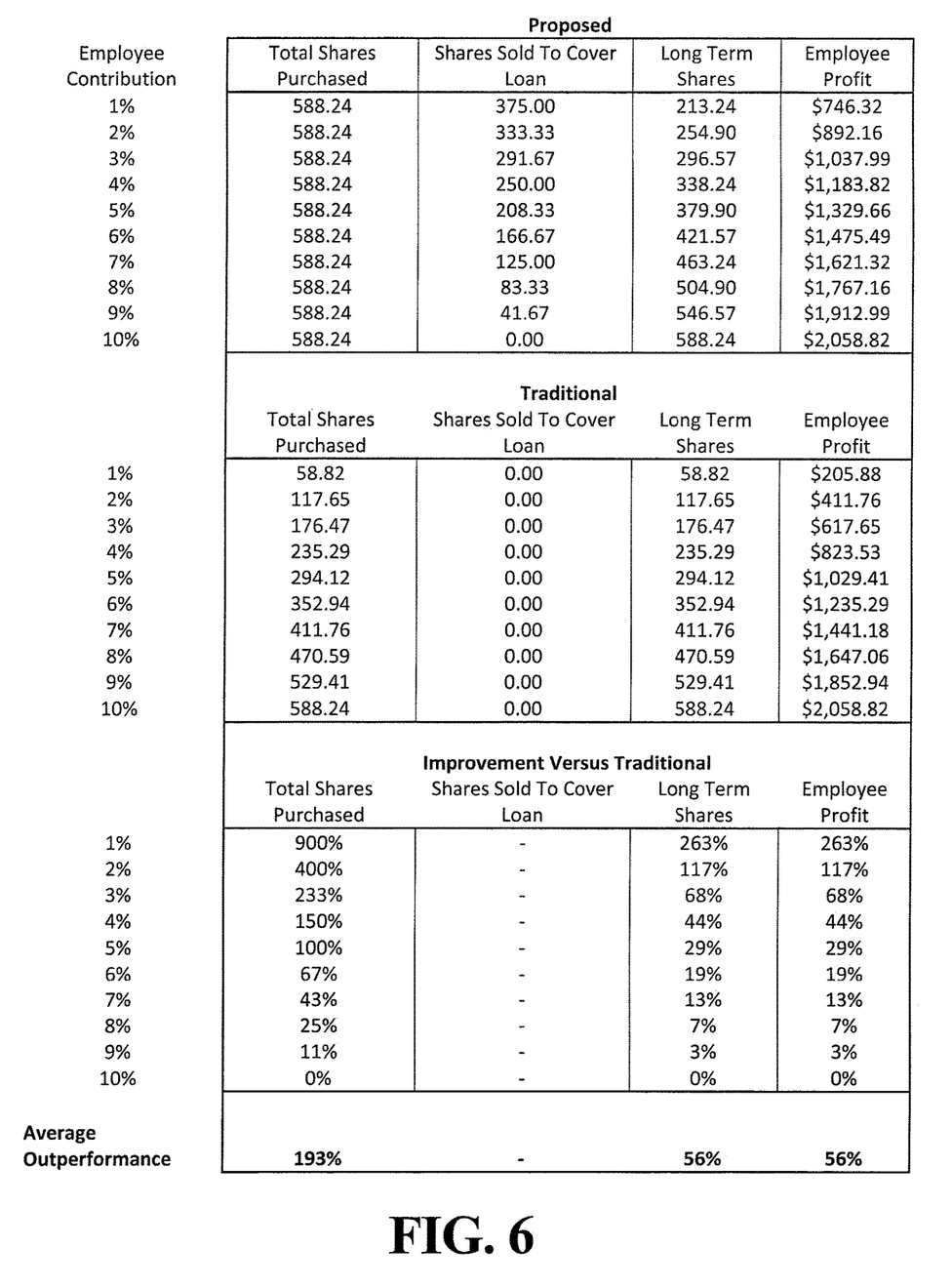
FIG. 6 is a table quantifying a theoretical employee's profit improvement of the method of the present invention over traditional employee stock purchase plans.

FIG. 6 shows a table quantifying a theoretical employee's profit improvement in accordance with the methodology of the present invention over traditional employee stock purchase plans. As shown in FIG. 6, the maximum number of stock shares that can be purchased under a theoretical ESPP is 588.24 shares, if the plan allows a maximum monetary contribution of 10% of an employee's salary (or $25,000 annually, if less), the employee's salary is $50,000, and such maximum monetary contribution is made (with the stock having a value of $10.00 at the beginning of the purchase period, $12.00 per share on the purchase date, and the employee purchasing shares at a 15% discount to the lower of the two share prices, or $8.50 per share). In the proposed method of the present invention, regardless of the employee's net capital contribution, 588.24 shares may be purchased (in this example where the loan is the maximum amount allowable), of which a number of shares must immediately be sold to cover the supplemental monetary contribution or loan made by the broker-dealer. It is assumed that the shares are sold at the purchase price (as opposed to any shares being sold at a lower rebalance price); and that the broker-dealer did not charge interest on the loan. (It is noted that if the broker-dealer does not charge the employee a minimum amount of interest equal to the Applicable Federal Rate ("AFR") applicable to the transaction, the difference between the actual amount charged and the AFR may be deemed taxable income to the employee). For example, with such assumptions if the employee contributes 5% and the broker-dealer also contributes 5%, 208.33 shares must be sold to cover the loan, resulting in 379.90 long term shares held by the employee, for a profit of $1329.66. By contrast, in the traditional ESPP, the amount of shares available for purchase is limited by the employee's capital contribution. Under a traditional ESPP, a theoretical employee would only be able to purchase 294.12 shares with an initial contribution of 5% (with no shares required to be sold because there was no loan) for a profit of $1029.41. As such, the theoretical employee enjoys an increased profit of 29% when utilizing the methodology of the present invention over a traditional ESPP, at a 5% contribution. As further shown in FIG. 6, the method of the present invention results in an average outperformance in the number of total shares purchased of 193% for contributions up to a maximum allowable monetary contribution of 10%, with an average outperformance in employee profit of 56% over a traditional ESPP, with the above assumptions. It should be understood by those skilled in the art that a maximum allowable contribution of 10%, as shown in FIG. 6, is being used for exemplary purposes only, and that the maximum allowable contribution may be less than or greater than 10%, in accordance with a particular employer's plan.

FIG. 7 shows an exemplary cash flow analysis for a theoretical employee in accordance with the methodology of the present invention, as described above. In this example, as shown at block 710, the employer stock price at the beginning of the offering period is $10 per share (with a 15% discount under the ESPP and "lookback" feature), with a rebalance price of $12 per share. Under the terms of the ESPP, the employee can contribute a maximum of $200 but due to personal liquidity constraints, the employee elects to contribute $100, of which the remaining $100 is contributed through a loan by a broker-dealer, for a total contribution in the maximum allowable amount of $200. Block 720 depicts the actual stock purchase price for various ending stock prices ranging from $1.00 through $15.00. Share prices at the end of the offering period exceeding the rebalance price of $12 represent in-the-money or ITM options. Pursuant to the option contract, the purchase price is $12 per share regardless of whether actual share price at the end of the offering period exceeds $12 per share. Out-of-the-money or OTM options are unexercised, and the transaction will be an open market sale or other sale transaction.

Block 730 shows that 23.53 shares were purchased at the discounted price of $8.50 per share, and that all 23.53 shares were then sold, at the end of the offering period. If the shares were sold at the rebalance price of $12.00, the total proceeds of the sale would equal $282.35. The total proceeds returned therefore would also equal $282.35, of which the initial $100 contribution is returned to the broker-dealer (assuming the broker-dealer did not charge interest), and the employee realizes a capital return of $182.35 (block 740), for a net profit of $82.35 and an effective return of 82.4% for the employee (block 750).

The present invention is further directed to a system that includes at least one computing device having software associated therewith that when executed is capable of performing a method to sell or instruct a broker to sell derivative instruments. The method includes the steps of: establishing an account with the broker to be owned by the company or a third party funding the difference in contributions or using a "broker assisted cashless exercise"; communicating via electronic transmission to the broker the forecasted number of derivative contracts to be sold short and long as well as the expiration date and strike price for each contract; and transferring property equivalent to any margin requirement into the account owned by the company or a third party funding the contribution difference. At least one step of the method is preferably accomplished by at least one computing device but may be completed manually.

In another aspect of the invention, a system is provided that includes at least one computing device having software associated therewith that when executed is capable of performing a method that segments shares purchased via the employee stock purchase plan into two categories: 1) shares for delivery to the option holder (upon exercise of the option and delivery of the exercise price, in the event of the sale of an option that on the purchase date is ITM) or broker and 2) shares to be sold directly or by broker, the proceeds of which will be returned to the employee. The method includes the steps of: transferring a number of shares equal to the number of shares purchased at the purchase date by all employees in which the underlying stock price has exceeded the rebalance price into an account owned by the company or a third party funding the contribution difference; delivering said shares to the owner of the option being exercised; transferring the appropriate pro-rata amount of capital from the account to which the option holders transferred the cash to settle the options delivery to an employee owned account; and transferring the proceeds of the sale of the shares not delivered to option holders to an account owned by the employee. At least one step of the method is preferably accomplished by at least one computing device but may be completed manually.

It should be appreciated and understood that the present invention may be embodied as systems, methods, apparatus, computer readable media, non-transitory computer readable media and/or computer program products. The present invention may take the form of an entirely hardware embodiment, an entirely software embodiment (including firmware, resident software, micro-code, etc.) or an embodiment combining software and hardware aspects that may all generally be referred to herein as a "circuit," "module" or "system." In one or more embodiments, the volatility calculation, liquidity calculation, transaction, monetary contribution, and share disbursement modules may take the form of a combination of software and hardware aspects residing and/or accessible by a processor residing on a remote server controlled by the third party lender or broker-dealer, while the electronic enrollment interface, payroll system and withholdings module may reside on and/or be accessible by the respective employer's servers, which are in network communication with the remote server. Alternatively, the present invention may take the form of a computer program product embodied in one or more computer readable medium(s) having computer readable program code embodied thereon, wherein the program code includes instructions to perform the processing steps undertaken in each of the modules.

One or more computer readable medium(s) may be utilized, alone or in combination. The computer readable medium may be a computer readable storage medium or a computer readable signal medium. A suitable computer readable storage medium may be, for example, but not limited to, an electronic, magnetic, optical, electromagnetic, infrared, or semiconductor system, apparatus, or device, or any suitable combination of the foregoing. Other examples of suitable computer readable storage medium would include, without limitation, the following: an electrical connection having one or more wires, a portable computer diskette, a hard disk, a random access memory (RAM), a read-only memory (ROM), an erasable programmable read-only memory (EPROM or flash memory), an optical fiber, an optical storage device, a magnetic storage device, or any suitable combination of the foregoing. A suitable computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Python, C++ or the like and conventional procedural programming languages, such as the "C" programming language or similar programming languages. The program code may execute entirely on the user's computing device (such as, a computer), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

Illustrative embodiments of the present invention are described herein in FIGS. 1 to 5, respectively, with reference to flowchart illustrations and/or block diagrams of methods, apparatus (systems), computer readable media, non-transitory computer readable media, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device or other programmable apparatus provide processes for implementing the functions/acts specified in the flowchart and/or block diagram block or blocks.

It should be appreciated that the function blocks or modules shown in the drawings illustrate the architecture, functionality, and operation of possible implementations of systems, methods and computer program media and/or products according to various embodiments of the present invention and that certain embodiments may omit certain functionality represented in the drawings. In this regard, each block in the drawings may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved. It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

Thus, the present invention achieves one or more of the objects above and provides a method for an employee to increase the number of shares purchased under their ESPP (potentially up the maximum allowable) without increasing their payroll contribution under the terms of the plan. The method provides for the disposition of shares acquired in the ESPP at an employee-designated or agreed-to rebalancing price, if applicable, with a third party administrator or broker contributing via a loan to the employee a loan amount up to the difference between the employee's contribution and the maximum allowable by the employer or law (whichever is lower), or some lower amount determined by the company, independent broker-dealer or non-bank lender, or selected by the employee, at the end of the offering period to an account used to purchase shares via the ESPP, and further selling the shares at the appropriate price and time and returning the proceeds from the sale of shares. In contrast to traditional ESPPs, the methodology of the present invention allows every employee to purchase an increased number of shares under their ESPP (potentially up the maximum allowable) regardless of their ability to afford payroll deductions, shifts the cost and capital requirements of the plan away from employees and employers to financial market participants, and maximizes the potential tax write-off for employers.

While the present invention has been particularly described, in conjunction with specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of increasing the number of shares purchased under an employee stock purchase plan with limited employee capital contributions, comprising the steps of: selecting, by each of a plurality of employees of an employer, a monetary contribution amount for contribution to the employee stock purchase plan, the selected monetary contribution amount being less than or equal to a maximum allowable contribution under limits of the employee stock purchase plan; aggregating, via a transaction module executable by a processor residing on a remote server operated by a third party, each of the plurality of employees into one of a plurality of virtual containers each having a distinct identification number assigned thereto based on the selected monetary contribution amount; providing, via a monetary contribution module executable by the remote server processor, by the third party on behalf of each of the plurality of employees, a supplemental monetary contribution having a principal equal to one of a difference between the selected monetary contribution amount by each employee and the maximum allowable contribution under the employee stock purchase plan during the offering period, or a lesser principal amount as may be elected or agreed to by the employee up to the maximum allowable contribution under the limits of the employee stock purchase plan; transmitting the supplemental monetary contribution to the employer or each employee directly on behalf of a financial or ledger account funded or credited with the selected monetary contribution or the equivalent value of shares which when sold would fund an exercise price amount of each employee during the offering period, each financial or ledger account used to purchase shares of employer stock via the employee stock purchase plan at the end of the offering period; disbursing to a transfer agent, plan administrator or each employee directly, via a share disbursement module executable by the remote server processor, instructions to issue, deliver or sell a number of shares of employer stock required to reimburse the supplemental monetary contribution by the third party, fund the exercise price of an option or, in the event of a sale of an option that on the purchase date is in-the-money, to allow the third party to deliver shares of employer stock to a counterparty upon the counterparty's exercise of the option or executing such transactions directly on behalf of the employee; disbursing, via the share disbursement module, to the third party from the employer or employee, the required number of shares of employer stock, or an equivalent amount of cash; disbursing, via the share disbursement module, to each of the plurality of employees from the employer, a number of shares of employer stock or cash equal to a difference between the number of shares of employer stock acquired using an aggregate of the selected monetary contribution and the supplemental monetary contribution, and the number of shares of employer stock disbursed to the third party from the employer in repayment of the supplemental monetary contribution remaining after using a portion of the shares to fund the exercise price, if applicable; delivering, via the transaction module, by the third party the acquired shares of employer stock for sale on the open market or otherwise; and returning, by the third party to the financial or ledger account of each of the plurality of employees, proceeds from the sale of the shares of employer stock to the counterparty or returning employer shares, wherein the proceeds and value of employer shares are equivalent to the value of employer shares from the employee stock purchase plan that the employee would have received if the employee had initially contributed an amount equal to a sum of the selected monetary contribution and the supplemental monetary contribution, minus the repayment amount related to the supplemental monetary contribution or use of shares to fund the exercise price.

2. The method of claim 1 further comprising the steps of: selling, via the transaction module, by the third party either via an open market sale on the financial exchange market or otherwise, at least a portion of the acquired shares of employer stock, the sale of at least a portion of the shares of employer stock defining a sale transaction and allowing for a return of sale proceeds to the financial or ledger account of the employee; deducting the repayment amount of the supplemental monetary contribution plus applicable fees from the sale proceeds to reimburse the third party; and returning, by the third party to the financial or ledger account of each of the plurality of employees, any remaining sale proceeds or remaining shares from the sale transaction.

3. The method of claim 1 further comprising the steps of: selling, via the transaction module, by the third party pursuant to settlement of a derivatives contract or other financial market transaction, at least a portion of the acquired shares of employer stock, the sale of at least a portion of the shares of employer stock plus a sufficient number of shares to cover applicable fees comprising a sale transaction and allowing for a return of sale proceeds to the financial or ledger account of the employee; deducting the repayment amount of the supplemental monetary contribution from the sale proceeds to reimburse the third party; and returning, by the third party to the financial or ledger account of each of the plurality of employees, any remaining sale proceeds or remaining shares from the sale transaction.

4. The method of claim 1 wherein the monetary contribution module further comprises an employee repository containing at least the selected monetary contribution amount and a selected or agreed-to rebalancing price of each of the plurality of employees.

5. The method of claim 4 further comprising the step of: associating the selected monetary contribution amount and, optionally, the selected or agreed-to rebalancing price of each of the plurality of employees in the employee repository with trade execution or supplementary monetary contribution group values.

6. The method of claim 4 wherein the selected monetary contribution amount of each of the plurality of employees in the employee repository is defined as one of a plurality of risk values selected from the group comprising high risk values, medium risk values and low risk values, and the method further comprises the step of: assigning the defined risk values to one of the plurality of virtual containers based upon the supplemental monetary contribution amount.

7. The method of claim 1 further comprising the steps of: defining, via a volatility calculation module executable by the remote server processor, one or more employer-specific volatility and liquidity values using the selected monetary contribution amount and, optionally, a selected or agreed-to rebalancing price of each of the plurality of employees, in relation to one or more values of the historical and implied volatility or recent liquidity of a stock price of employer stock; and determining, using the one or more employer-specific volatility and liquidity values, whether listed or over-the-counter derivatives should be utilized to facilitate a disposition of employer stock on the financial exchange market.

8. The method of claim 7 further comprising the steps of: defining, via the volatility calculation module, an employer-specific leverage value using the selected monetary contribution amount and, optionally, the selected or agreed-to rebalancing price of each of the plurality of employees, in relation to historical and implied volatility of the stock price of employer stock; and determining, using the employer-specific leverage value, whether financial leverage should be utilized to fund any margin requirement associated with selling a derivative to facilitate disposition of employer stock on the financial exchange market.

9. The method of claim 1 wherein the step of providing a supplemental monetary contribution, by the third party on behalf of each of the plurality of employees, comprises providing a legal notice to the employee that in lieu of a supplemental monetary contribution a portion of shares granted under the option will be used by the third party to fund the exercise price of the option.

\* \* \* \* \*